United States Patent
Blunier et al.

(10) Patent No.: US 10,138,935 B2
(45) Date of Patent: Nov. 27, 2018

(54) AGRICULTURAL ROLLING BASKET BEARING ASSEMBLY

(71) Applicant: CNH Industrial America LLC, New Holland, PA (US)

(72) Inventors: Timothy R. Blunier, Danvers, IL (US); Gaylen J. Kromminga, Morton, IL (US); Sven N. Setterdahl, Maquon, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/377,306

(22) Filed: Dec. 13, 2016

(65) Prior Publication Data
US 2017/0114830 A1    Apr. 27, 2017

Related U.S. Application Data

(62) Division of application No. 14/535,616, filed on Nov. 7, 2014, now Pat. No. 9,677,608.

(51) Int. Cl.
*F16C 27/06*  (2006.01)
*A01B 71/04*  (2006.01)
(Continued)

(52) U.S. Cl.
CPC ............ *F16C 27/066* (2013.01); *A01B 71/04* (2013.01); *A01B 76/00* (2013.01); *F16C 17/02* (2013.01); *F16C 23/08* (2013.01); *F16C 33/20* (2013.01); *F16C 33/22* (2013.01); *A01B 29/048* (2013.01); *F16C 2310/00* (2013.01)

(58) Field of Classification Search
CPC .................................................. F16C 27/066
See application file for complete search history.

(56) References Cited

U.S. PATENT DOCUMENTS 2,252,593 A    8/1941  Bruene
3,381,631 A    5/1968  Homlein et al.
(Continued)

FOREIGN PATENT DOCUMENTS

DE    2 323 436 A1    11/1974
DE    199 62 587 A1    7/2001
(Continued)

OTHER PUBLICATIONS

"Composite Automatic Wing Drilling Equipment (CAWDE)", Benjamen Hempstead, PE, Brent Thayer, Elctroimpact, Inc., Stephen Williams, Airbus UK, 2006 (8 pages).
(Continued)

*Primary Examiner* — Thomas R Hannon
(74) *Attorney, Agent, or Firm* — Rebecca L. Henkel; Rickard K. DeMille

(57) ABSTRACT

An agricultural tillage implement includes a frame member and at least one rolling basket assembly coupled to the frame member. The rolling basket assembly has at least one bearing hanger, at least one rolling basket and at least one bearing assembly rotationally coupling the rolling basket to the bearing hanger. The bearing assembly has a bearing with an inner ring and a spindle holding the inner ring. The spindle is coupled to the bearing hanger. The spindle being configured to accommodate dynamic misalignment of the bearing.

6 Claims, 2 Drawing Sheets

(51) Int. Cl.
*F16C 23/08* (2006.01)
*A01B 76/00* (2006.01)
*F16C 17/02* (2006.01)
*F16C 33/20* (2006.01)
*F16C 33/22* (2006.01)
*A01B 29/04* (2006.01)

(56) References Cited

U.S. PATENT DOCUMENTS

| | | | |
|---|---|---|---|
| 3,746,413 A * | 7/1973 | Nishikawa | F16C 13/006 384/542 |
| 4,084,355 A | 4/1978 | Balz | |
| T981,004 I4 * | 4/1979 | McNeely | B60B 9/12 187/410 |
| 4,263,974 A | 4/1981 | van der Lely | |
| 4,375,247 A * | 3/1983 | McNeely | B66F 9/08 187/238 |
| 4,708,514 A | 11/1987 | Walter et al. | |
| 4,852,230 A * | 8/1989 | Yu | B65G 39/09 193/37 |
| 5,114,000 A | 5/1992 | Rappen | |
| 5,295,744 A * | 3/1994 | Petrzelka | B60K 17/24 384/536 |
| 5,487,613 A * | 1/1996 | Waskiewicz | F16C 35/0635 384/460 |
| 5,792,033 A * | 8/1998 | Merrithew | A63B 21/023 384/19 |
| 5,842,405 A * | 12/1998 | Schaefer | F04B 1/0413 417/273 |
| 5,911,607 A | 6/1999 | Lacko et al. | |
| 5,971,678 A | 10/1999 | Linderholm | |
| 5,993,069 A * | 11/1999 | Arrasmith | A47J 43/07 384/477 |
| 6,536,953 B1 * | 3/2003 | Cope | B65H 54/547 384/536 |
| 6,953,399 B2 | 10/2005 | Kirschey | |
| 7,263,867 B2 * | 9/2007 | Bartosch | F16H 53/06 384/449 |
| 7,571,682 B2 | 8/2009 | Bianco | |
| 7,594,546 B2 | 9/2009 | Ankenman | |
| 7,942,210 B2 | 5/2011 | Andenman | |
| 8,069,848 B1 | 12/2011 | Larson | |
| 8,297,386 B2 | 10/2012 | Osuga et al. | |
| 8,302,504 B2 | 11/2012 | Dal Pra' | |
| 8,365,630 B2 | 2/2013 | Oberle et al. | |
| 8,366,883 B2 | 2/2013 | Bednarek et al. | |
| 8,727,033 B2 | 5/2014 | Kovach | |
| 9,526,198 B2 * | 12/2016 | Johansson | A01B 71/04 |
| 2004/0109621 A1 * | 6/2004 | Frost | B65G 17/20 384/58 |
| 2010/0006309 A1 | 1/2010 | Ankenman | |
| 2011/0030979 A1 | 2/2011 | Kovach | |
| 2014/0262379 A1 | 9/2014 | Landoll | |
| 2015/0292591 A1 | 10/2015 | Neilsen | |
| 2016/0212926 A1 | 7/2016 | Westlind | |

FOREIGN PATENT DOCUMENTS

| | | |
|---|---|---|
| GB | 801761 A | 9/1958 |
| GB | 908111 A | 10/1962 |

OTHER PUBLICATIONS

"Plastic Bearings & Bushings", Tetralon Polymer Bearings & Bushings—Meet the Challenger of Severe-Duty Environments, CoorsTek, Inc., Jan. 1, 2013 (2 pages).

* cited by examiner

AGRICULTURAL ROLLING BASKET BEARING ASSEMBLY

CROSS REFERENCE TO RELATED APPLICATIONS

This is a divisional non-provisional utility patent application based upon U.S. non-provisional utility patent application Ser. No. 14,535,616, entitled "AGRICULTURAL ROLLING BASKET BEARING ASSEMBLY", filed Nov. 7, 20143, which is based upon U.S. provisional patent application Ser. No. 61/903,444, entitled "AGRICULTURAL ROLLING BASKET BEARING ASSEMBLY", filed Nov. 13, 2013, both of which are incorporated herein by reference.

BACKGROUND OF THE INVENTION

1. Field of the Invention

The present invention relates to agricultural implements, and, more particularly, to a bearing assembly used with a rolling basket of an agricultural tillage implement.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling basket, etc., or any combination thereof. The rolling basket has a reel with a plurality of blades for breaking clods into smaller sizes and chopping up the debris still remaining on the top of the soil.

The rolling basket arrangement can be used to roll behind the rows of tines of a harrow, to flatten the ridges left by the tines and move the residual crop material into the soil to enhance contact with the soil. The rolling basket is used to provide a firm, level field with coarse soil on top that resists crusting, with the finer soil particles at planting depth for optimum seed-to-soil contact.

The rolling baskets generally have bearings located at each end of the basket. As the baskets traverse a field the bars that impact clods of dirt and variations in the soil cause the bars to flex which translates to a flexure of the end plates, which are connected to the bearings. This kind of motion causes stress on the bearings resulting in bearing oscillation and premature bearing failure.

What is needed in the art is a bearing assembly that can withstand oscillating angular forces encountered by the bearings of rolling baskets of an agricultural tillage implement.

SUMMARY OF THE INVENTION

The present invention provides a tillage implement with rolling basket assemblies, which are configured to preserve bearing life by accommodating dynamic misalignment of the bearings.

The invention in one form is directed to an agricultural tillage implement including a frame member and at least one rolling basket assembly coupled to the frame member. The rolling basket assembly has at least one bearing hanger, at least one rolling basket and at least one bearing assembly rotationally coupling the rolling basket to the bearing hanger. The bearing assembly has a bearing with an inner ring and a spindle holding the inner ring. The spindle is coupled to the bearing hanger. The spindle being configured to accommodate dynamic misalignment of the bearing.

The invention in another form is directed to a bearing assembly having a bearing with an inner ring and a spindle holding the inner ring. The spindle is coupled to a bearing hanger. The spindle is configured to accommodate dynamic misalignment of the bearing.

The invention in yet another form is directed to a method of accommodating a dynamic misalignment of a bearing that couples a rolling basket to a bearing hanger of an agricultural implement, comprising the steps of carrying the bearing on a resilient spindle that is coupled to the bearing hanger; and providing a gap along a side of the bearing.

An advantage of the present invention is that it extends the life of the bearings.

Another advantage of the present invention is that it is applicable to a large number of tillage equipment platforms.

Yet another advantage is that the present invention is easily applied to legacy equipment, thereby reducing retrofit costs.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate some embodiments of the invention and such exemplifications are not to be construed as limiting the scope of the invention in any manner.

DETAILED DESCRIPTION OF THE INVENTION

Figure 1:
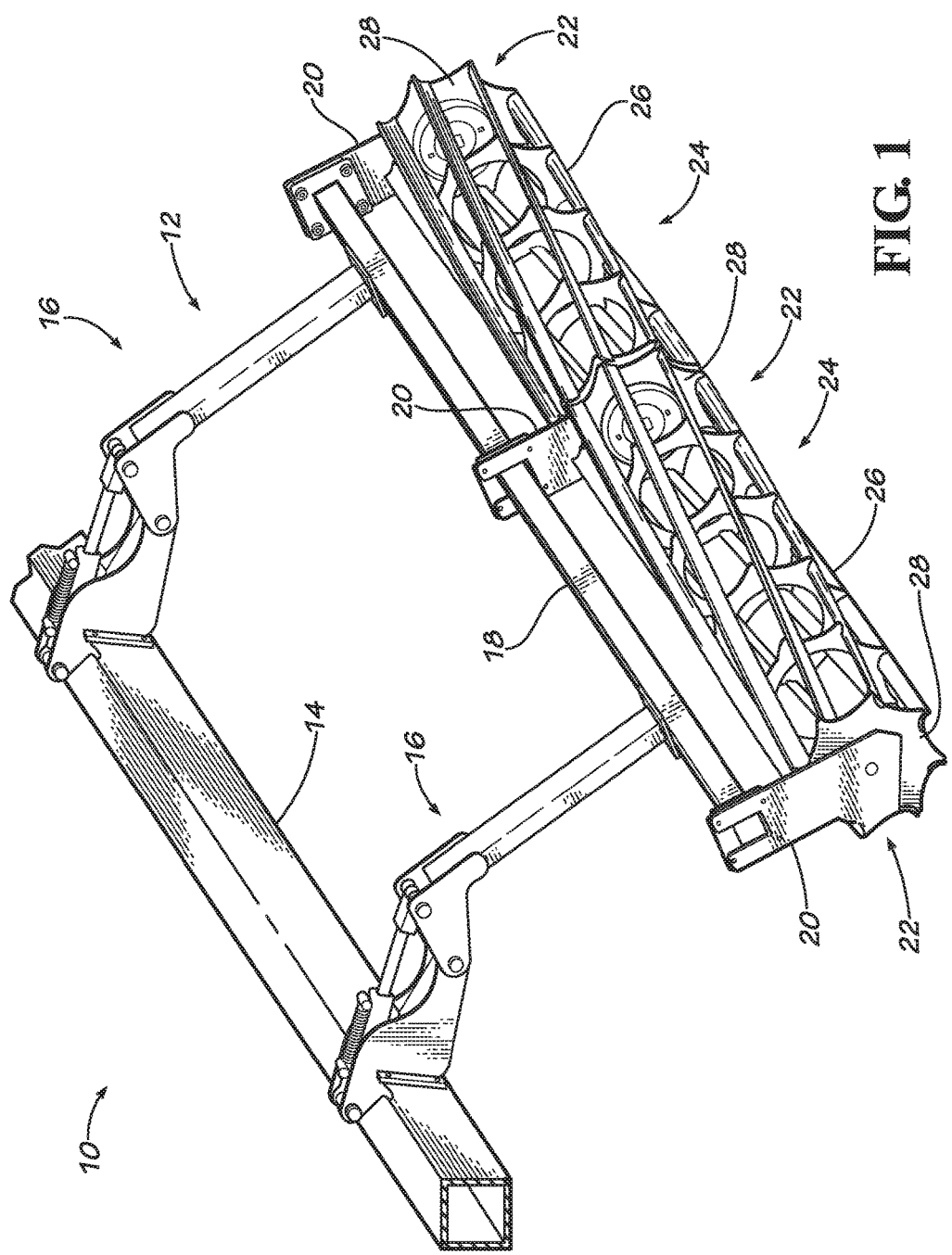
FIG. 1 is a perspective view of an agricultural tillage implement using an embodiment of a bearing assembly of the present invention to couple rolling baskets to the implement.
Figure 2:
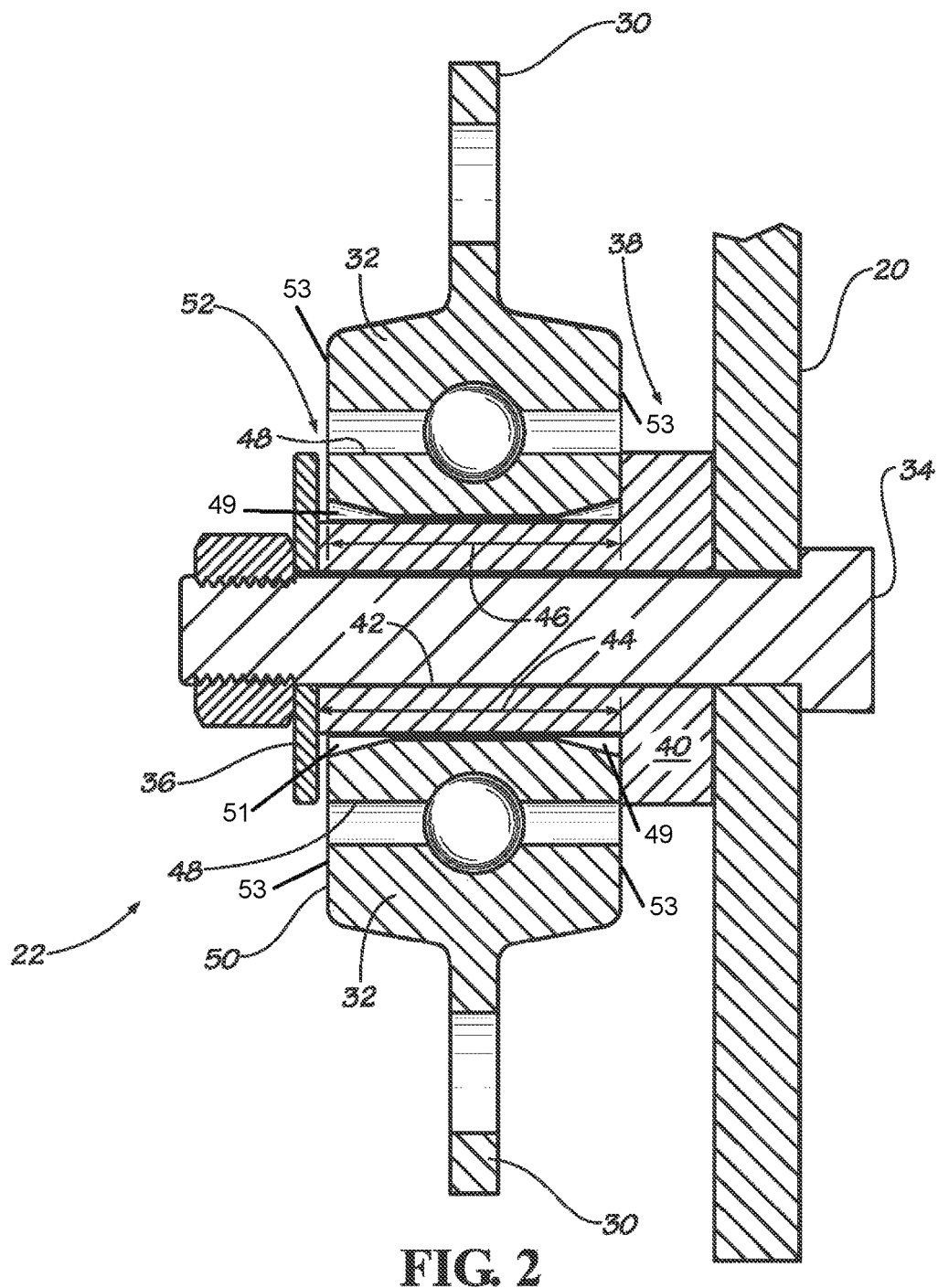
FIG. 2 is a partially sectioned view of the bearing assembly used in the rolling basket assemblies of FIG. 1.

Referring now to the drawings, and more particularly to FIGS. 1 and 2, there is shown an embodiment of a tillage implement 10 of the present invention. Tillage implement 10 includes a rolling basket assembly 12 connected to a frame member 14 of implement 10. Frame 14 is part of tillage implement 10 that is towed by a traction unit, such as by an agricultural tractor (not shown).

Rolling basket assembly 12 may be one of several rolling basket assemblies connected to frame 14, which collectively may be thought of as an auxiliary implement for finishing the soil. The auxiliary implement may include a spring tooth drag (not shown) and rolling basket assemblies 12 which act to finish the soil.

Rolling basket assembly 12 has positioning arms 16, a sub frame 18, bearing hangers 20, bearing assemblies 22 and baskets 24. Baskets 24 have bars 26 which extend to end plates 28 at each end of bars 26. Bars 26 may have various shapes and be arranged in a straight or spiral fashion. As bars 26 encounter clods of dirt or other irregularities on the ground, bars 26 act to break up the clods and irregularities. Some flexure of bars 26 occurs as they carry out their function and this movement is transferred to some extent to end plates 28. As end plates 28 are flexed this is also transferred to bearing assembly 22. Bearing assembly 22 is configured to accommodate this force and what can be referred to as dynamic misalignment of bearing assembly 22.

Bearing assembly 22 includes a bearing flange 30, a bearing 32, a fastener 34, a washer 36, and a spindle 38. Fastener 34, which may be a bolt and nut, are used to secure spindle 38 to bearing hanger 20. Bearing flange 30 is fastened to end plate 28 thereby providing for the rotational coupling of basket 24 to bearing hanger 20. Spindle 38, in the embodiment shown, has a shoulder 40 and a body 42, made of a resilient material, such as a rubberized plastic material, or a molded urethane. Body 42 of spindle 38 has a length 44 and bearing 32 has a width 46, with length 44 being longer than width 46 to thereby allow axial movement of bearing 32 on body 42. Bearing 32 has an inner ring 48 that sets on the surface of body 42 and an outer ring 50 that is connected to, or is integral with bearing flange 30. Bearing 32 is positioned via opening 49 on body 42 of spindle 38. Opening 49 through hearing 32 forms a widened perimeter 51 on each side 53 of bearing 32 and each widened perimeter 51 next to spindle 38 has a triangular shape in cross-section. The resilient nature of spindle 38 and widened perimeter 51 on each side 53 of bearing 32 allow bearing 32 to slightly tilt when needed by forces that would tend to misalign bearing 32. The existence of a gap 52, as depicted in FIG. 2, is for the purpose of illustration and as the invention is accommodating the dynamic misalignment of bearing 32, gap 52 may shift to the other side of bearing 32 or may exist to some degree on both sides of bearing 32. When bearing 32 tilts due to forces transferred to it by end plate 28 a portion of bearing 32 may contact a portion of washer 36 and a portion of bearing 32 may contact part of shoulder 40.

Fastener 34 extends through spindle 38 and is used to tightly secure spindle 38 to bearing hanger 20. Shoulder 40 may be circular, square or some other shape in cross section, and may interact with a surface feature on bearing hanger 20 to further secure spindle 38 thereto. Washer 36 is oversized and extends beyond the outer circumference of body 42, thereby capturing bearing 32 on body 42.

The present invention improves the dynamic misalignment capability of a bearing assembly by providing an axle for the bearing to run on that is more flexible or resilient that the prior art steel-on-steel designs. Spindle 38 is made of a plastic type of material with high elasticity and is bolted to bearing hanger 20, also known as a basket supporting upright. Misalignment of bearing 32 can occur when the axis of rotation of the bearing inner portion is not aligned with the axis of rotation of the bearing outer portion. Dynamic misalignment occurs when the angles of the two axes are constantly changing. This situation occurs frequently in bearings mounted with this type of agricultural implement. Excessive dynamic misalignment causes premature wear and failure of the bearing. The combination of the bolted joint design and highly elastic material of the present invention allows the magnitude of the angle between the axes of rotation to increase without greatly increasing the bearing loads that the steel axle of the prior art causes.

An advantage of the present invention is that it extends the life of the bearing. Another advantage is that the present invention is applicable to a large number of tillage equipment platforms. Yet another advantage is that the present invention is easily applied to legacy equipment, thereby reducing retrofit costs.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An assembly configured to rotationally couple a rotating element to a bearing hanger of an agricultural implement, the assembly comprising:
   the rotating element of the agricultural implement and the bearing hanger thereof, the rotating element including components which are required to flex during field operation;
   a bearing with an opening formed therethrough;
   a resilient spindle carried by a fastener, the fastener coupled to the bearing hanger, the resilient spindle positioned over the fastener and including a resilient shoulder positioned between the bearing hanger and the bearing,
   wherein the bearing is positioned via the opening therein on the resilient spindle, and one side of the bearing is positioned next to the resilient shoulder,
   wherein a gap is provided between the bearing and at least one component positioned on the resilient spindle such that movement of the bearing on the resilient spindle results in a shift of the gap from the one side of the bearing to an opposite side of the bearing,
   wherein during field operations, the bearing is configured to dynamically misalign and tilt due to the resilient shoulder and the gap to accommodate flexing of the components of the rotating element, wherein the one side of the bearing contacts the resilient shoulder at least during dynamic misalignment, and
   wherein during field operations, the resilient shaft is configured to flex to accommodate flexing of the components of the rotating element to prevent excessive dynamic misalignment of the bearing and excessive wear thereof.

2. The assembly of claim 1, wherein the rotating element comprises a rolling basket.

3. The assembly of claim 1, wherein the resilient spindle has a body length, the opening through the bearing has a width, such that the length exceeds the width.

4. The assembly of claim 1, further comprising a washer constrained on an end of the fastener against an end of the resilient spindle, the washer extending beyond the resilient spindle, and wherein the opposite side of the bearing contacts the washer during dynamic misalignment of the bearing.

5. The assembly of claim 1, wherein the resilient spindle and the resilient shoulder comprise a material which contains a urethane.

6. The assembly of claim 1, wherein the resilient spindle and the resilient shoulder comprise a material which includes a rubberized plastic.

\* \* \* \* \*